United States Patent [19]

Takashima et al.

[11] Patent Number: 5,762,970
[45] Date of Patent: Jun. 9, 1998

[54] PARISON FORMING APPARATUS INCLUDING CORE INSERT AND PARISON TRANSFER DEVICES FOR FORMING A COMPOSITE PARISON

[75] Inventors: Tadayoshi Takashima; Susumu Nakagawa, both of Hamamatsubaracho, Japan

[73] Assignee: Yamamura Glass Co., Ltd., Hyogo, Japan

[21] Appl. No.: 581,448

[22] Filed: Dec. 29, 1995

[30] Foreign Application Priority Data

Dec. 30, 1994 [JP] Japan .................. 6-338608

[51] Int. Cl.⁶ .................. B29C 45/14; B29C 49/06; B29C 49/22
[52] U.S. Cl. .................. 425/126.1; 425/525; 425/533; 425/534; 264/537
[58] Field of Search .................. 425/126.1, 522, 425/525, 533, 534; 264/516, 537

[56] References Cited

U.S. PATENT DOCUMENTS

| 4,040,233 | 8/1977 | Valyi | 264/516 |
| 4,285,657 | 8/1981 | Ryder | 425/525 |
| 4,293,520 | 10/1981 | Akutsu | 264/516 |
| 4,342,799 | 8/1982 | Schwochert | 264/516 |
| 4,507,258 | 3/1985 | Aoki | 425/533 |
| 4,715,504 | 12/1987 | Chang et al. | 425/525 |
| 4,988,472 | 1/1991 | Orimoto et al. | 264/275 |
| 5,447,766 | 9/1995 | Orimoto et al. | 425/525 |
| 5,527,173 | 6/1996 | Miller et al. | 425/126.1 |

FOREIGN PATENT DOCUMENTS

| 2-5564 | 2/1990 | Japan | 264/516 |

*Primary Examiner*—Robert Davis
*Attorney, Agent, or Firm*—Price, Gess & Ubell

[57] ABSTRACT

A parison forming apparatus excellent in working efficiency and a parison forming method are provided. A moving plate which possesses core feed rows composed of multiple core receiving holders for feeding the multiple heat resistant resin cores to the mold device, and parison takeout rows composed of multiple parison receiving holders for taking out and receiving already formed multiple parisons from the mold device, being formed at a distance of a specific pitch interval from the core feed rows, and feeds the heat resistant resin cores from the core feed rows into the mold device which is empty after the parisons are taken out.

12 Claims, 6 Drawing Sheets

PARISON FORMING APPARATUS INCLUDING CORE INSERT AND PARISON TRANSFER DEVICES FOR FORMING A COMPOSITE PARISON

BACKGROUND OF THE INVENTION

1. Field of the Invention

The present invention relates to a parison forming apparatus and parison forming method, and more particularly to a novel parison forming apparatus and its forming method for forming a parison in a multilayer structure of bottle forming resin layer and heat resistant resin core (insert piece), having a same transparency as the body of a PET (polyethylene terephthalate) bottle with biaxial orientation. The heat resistant resin core and bottle forming resin layer, are multi-layered during manufacturing a bottle by biaxial stretch-blow molding of a parison formed by using PET or the like as bottle forming resin material.

2. Description of the Prior Art

Generally, in forming this kind of parison, as shown in FIG. 6, first a preformed heat resistant resin core 1 is held by clamping its mold contact part with a neck mold 32, and successively to clamping of the neck mold 32, a core mold 33 and cavity mold 34 are clamped, and then a PET resin material M is injection formed into a cavity 35 from a gate G to form a bottle body d (see FIG. 7), and then the PET resin material M is flowed from inside to outside of the heat resistant resin core 1 to form a bottle neck 21. This bottle neck is usually a three-layer structure with a portion of the heat resistant resin core portion is sandwiched by the PET resin material M.

The parison 13 thus formed (see FIG. 7) is blown into a biaxially stretched PET bottle (not shown).

Although the apparatus itself for feeding a preformed heat resistant resin core into the parison forming mold device is known, never has been hitherto known a parison forming apparatus excellent in working efficiency and capable of performing efficiently the jobs of feeding multiple heat resistant resin cores into the mold device at the same time, that it can also take out multiple parisons from the mold device, and feed them into the biaxial stretch blowing process.

SUMMARY OF THE INVENTION

In the light of the above problems, it is hence a primary object of the invention to provide a parison forming apparatus excellent in working efficiency and a parison forming method.

In order to achieve the above described object, a parison forming apparatus according to the present invention is characterized in that for transferring preformed multiple heat resistant resin cores, feeding them into specified positions of a parison forming mold device, feeding a bottle forming resin material into the mold device to form the body, multi-laying the bottle forming resin material and heat resistant resin core to form a bottle neck, and blow molding the thus formed parison by biaxial stretch-blow molding, thereby forming a bottle, the invention includes a moving plate which possesses core feed rows composed of multiple core receiving holders for feeding the multiple heat resistant resin cores to the mold device, and parison takeout rows composed of multiple parison receiving holders for taking out and receiving already formed multiple parisons from the mold device. The parison takeout rows are formed at a distance of a specific pitch interval from the core feed rows, which feed the heat resistant resin cores from the core feed rows into the mold device which is empty after the parisons are taken out.

A parison forming apparatus according to the present invention is also characterized in that for transferring preformed multiple heat resistant resin cores, feeding them into specified position of a parison forming mold device, feeding a bottle forming resin material into the mold device to form the body, multi-laying the bottle forming resin material and heat resistant resin core to form a bottle neck, and blow molding the thus formed parison by biaxial stretch-blow molding, thereby forming a bottle, the invention comprising a moving plate for receiving multiple heat resistant resin cores through a core transfer device for mounting and holding the multiple heat resistant resin cores, and a parison forming mold device for receiving the multiple heat resistant resin cores from the moving plate to form parisons, wherein the moving plate possesses core feed rows composed of multiple core receiving holders for feeding the multiple heat resistant resin cores to the mold device, and parison takeout rows composed of multiple parison receiving holders for taking out and receiving already formed multiple parisons from the mold device, being formed at a distance of a specific pitch interval from the core feed rows, and feeds the heat resistant resin cores from the core feed rows into the mold device which is empty after the parisons are taken out.

A parison forming method according to the present invention is characterized by transferring preformed multiple heat resistant resin cores, feeding into specified position of a parison forming mold device, feeding a bottle forming resin material into the mold device to form the body, multi-laying the bottle forming resin material and heat resistant resin core to form a bottle neck, and blow molding the thus formed parison by biaxial stretch-blow molding, thereby forming a bottle, comprising an initial core feeding step for feeding into specified position of a parison forming mold device multiple heat resistant resin cores transferred on a moving plate from a core transfer device at a core transfer position, an initial parison forming step for forming parisons by clamping the mold device after an empty moving plate leaves the mold device, an initial return step for returning the empty moving plate to the core transfer position, a moving step for moving the moving plate holding multiple heat resistant resin cores transferred by a core transfer device to a parison takeout position in the mold device, a parison takeout step for taking out multiple parisons formed in the initial parison forming step during the moving step from the open mold device by the moving plate, a step for moving by a specific pitch from a parison takeout position to a core feeding position, a core feed step for feeding the heat resistant resin cores on the moving plate, while the moving plate is holding the parisons, to the mold device becoming empty after the parisons are taken out, a parison forming step for forming parisons until the moving plate comes to the parison takeout position in the next moving step by clamping the mold device after the moving plate holding the parisons leaves the mold device, a parison transfer step for transferring the parisons received in the parison takeout step to a parison conveying device for blow molding device, in the course of the return step of the moving plate after leaving the mold device returning to the core transfer position, and a return step for returning an empty moving plate after transferring parisons to the parison conveying device to the core transfer position.

A greatest feature of the invention is that one moving plate is responsible for both feeding heat resistant resin cores into a parison forming mold device, and taking out the formed parisons from the mold device, and executes these operations sequentially. Hence, the working efficiency is enhanced. That is, it is not necessary to install another jig for taking out parisons from the parison forming mold device, and a simultaneous operation is realized only by shifting the moving plate for the portion of the pitch between the core feed row and parison takeout row, so that the controllability and workability are excellent. Moreover, only one moving plate saves substantially the space of the apparatus itself comprising a control unit.

The moving plate in the invention plays both the role of feeding heat resistant resin cores (hereinafter called cores) into the parison forming mold device, and the role of taking out the formed parisons from the mold device, all by one unit, and the moving plate comprising a core feed row composed of multiple core receiving holders for feeding cores into the mold device, and a parison takeout row composed of multiple parison receiving holders for taking out and receiving the formed multiple parisons out of the mold device, when moved to the core feeding position into the mold device, being formed at a distance of a specific pitch interval from the core feed row.

The invention, taking note of the operation for feeding cores into the parison forming mold device and the operation for taking out the formed parisons from the mold, mainly comprises an initial core feeding step for transferring cores for the first time to the moving plate at the core transfer position and feeding cores into the specified position in the parison forming mold device, a moving step for moving the moving plate first to the parison takeout position of the mold device in order to feed the newly transferred cores through a core transfer device to an empty moving plate while forming a parison in the mold device, into the mold device after the mold device opens following parison forming, a parison takeout step for taking out formed multiple parisons from the mold device, a step for moving the moving plate by a specific pitch from the parison takeout position to the core feeding position, and a step for feeding cores into an empty mold device. After the second moving step for feeding cores into the specified position in the mold device, the parison takeout step and core feeding step are repeated sequentially by shifting the moving plate for the portion of the pitch between the core feed row and parison takeout row, in the state of receiving and holding parisons in the moving plate.

Instead of shifting the moving plate, alternatively, only the core feed row and parison takeout row may be shifted.

As the bottle forming resin material in the invention, polyethylene terephthalate (PET) resin is representative, but other resins may be also used.

As a heat resistant resin core 1 in the invention, for example, as shown in FIGS. 6 to 8, a cylindrical body (a) and a flange (b) are provided, and multiple through-holes (c) are formed in the circumferential wall of the cylindrical body (a) as the passage of bottle forming resin material M. Therefore, as the bottle forming resin material M flows from the inside of the cylindrical body (a) to the outside of the cylindrical body (a) through the through-holes (c), the majority of the cylindrical body (a) is sandwiched between the inner and outer side layers being embedded into bottle forming resin layers (R), (T), thereby forming a parison 3.

Not limited to a bottle neck 21 formed by flowing the bottle forming resin material from inside to outside of the cylindrical body (a) of the core passing through the through-holes (c) as stated above, the invention may be also applied to a bottle neck 22 (see FIG. 9) forming the bottle forming resin layer (R) only at the inside of the cylindrical body (a), or a bottle neck forming the bottle forming resin layer only at the outside of the cylindrical body.

DETAILED DESCRIPTION OF THE PREFERRED EMBODIMENT

An embodiment of the invention is described below. It must be noted, however, that the invention is not limited by the illustrated embodiment alone.

Figure 1:
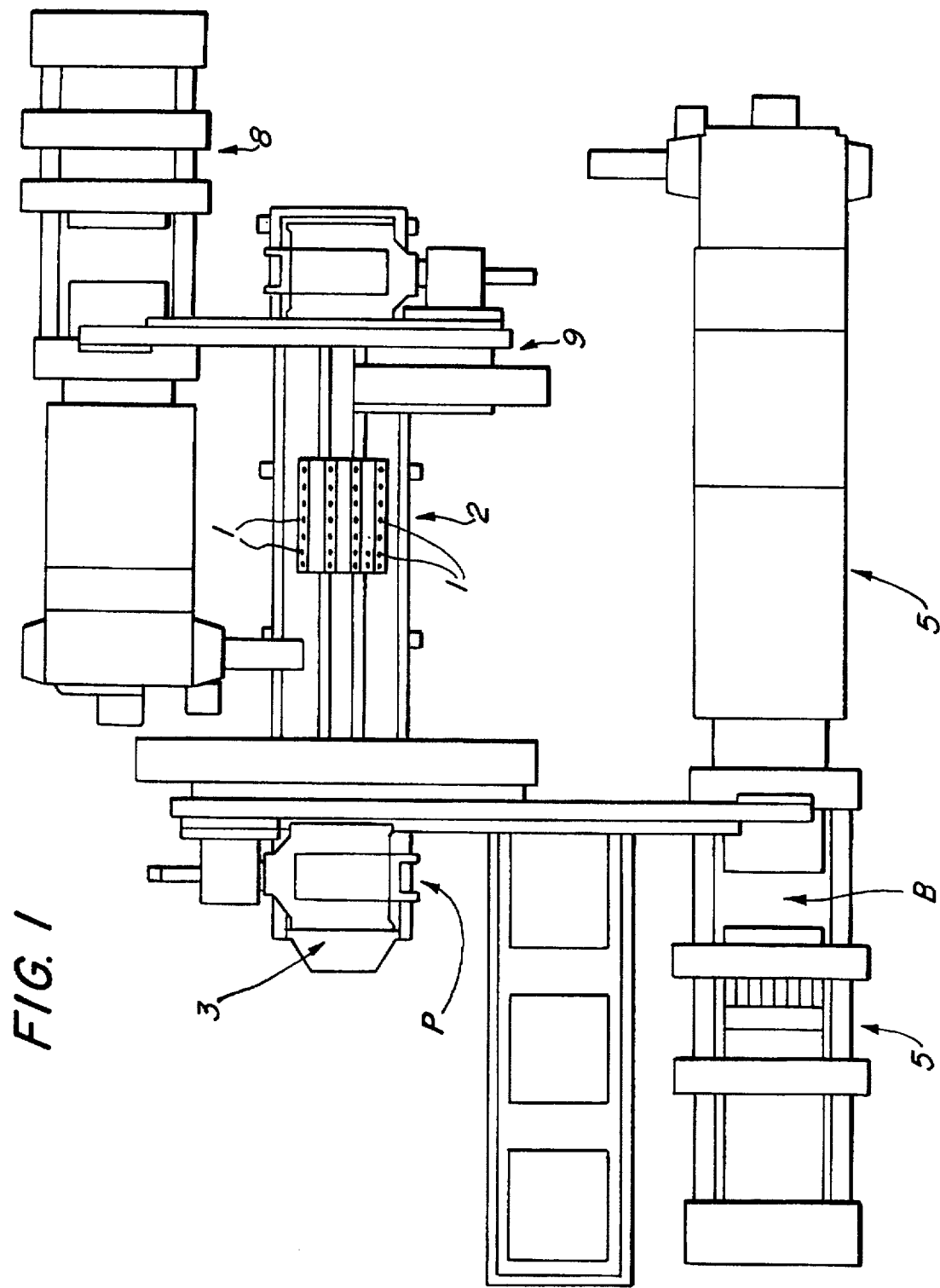
FIG. 1 is a general structural explanatory drawing showing an embodiment of the invention.
Figure 2:
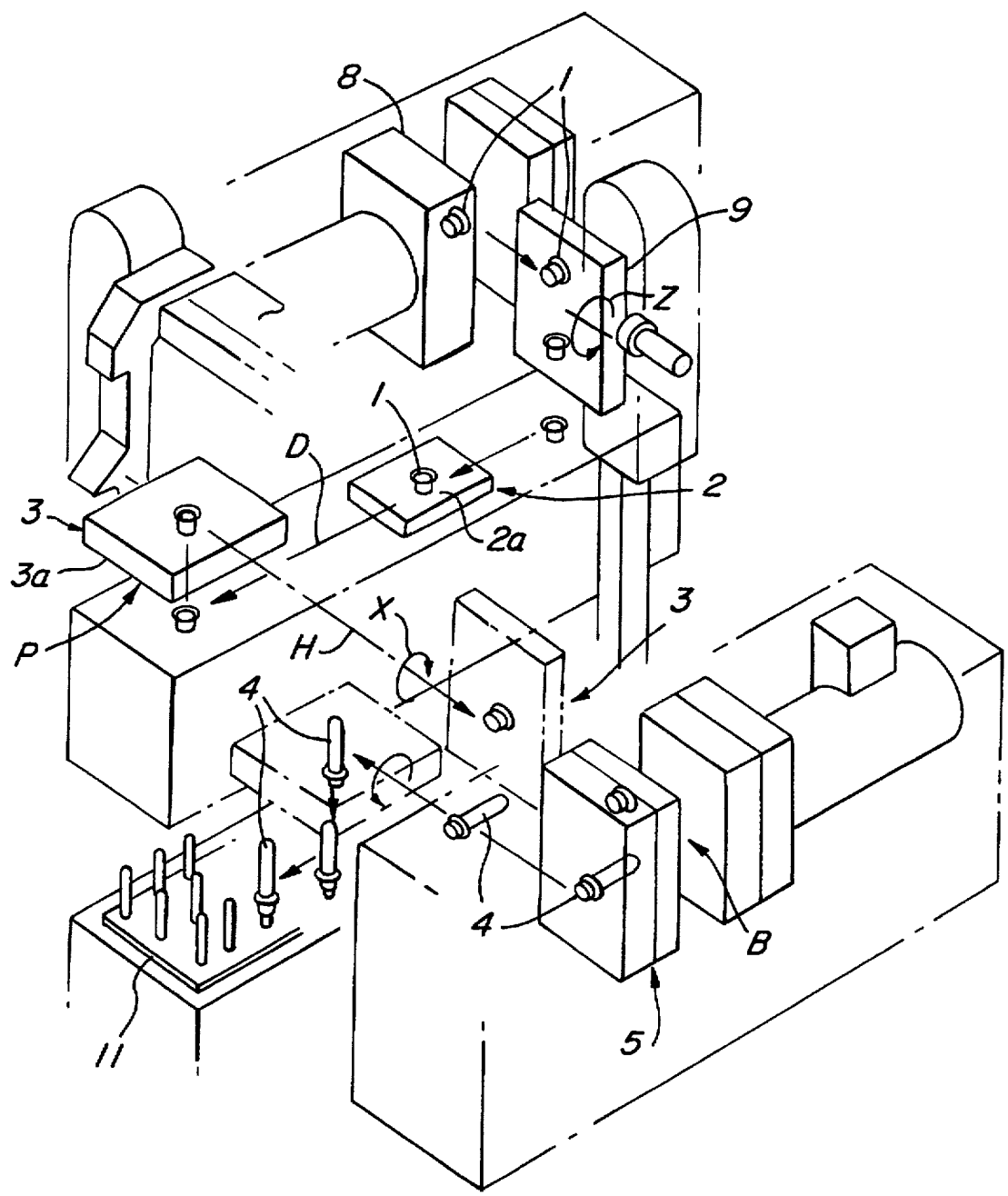
FIG. 2 is a structural explanatory drawing showing operation of a moving plate in the embodiment.
Figure 6:
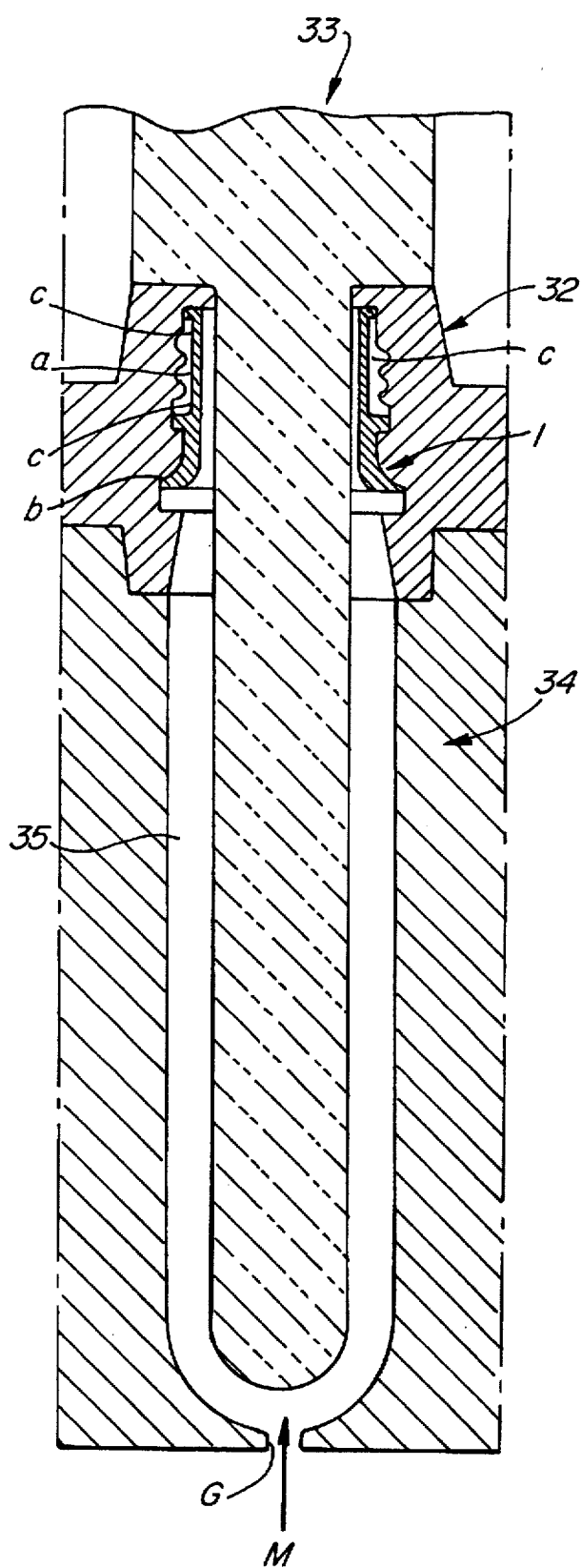
FIG. 6 is a longitudinal sectional view showing a mold device.

In FIGS. 1 and 2, a parison forming apparatus P, feeds preformed heat resistant resin cores (hereinafter called cores) 1 into a specified position in a parison forming mold device, clamps the mold, and injects bottle forming resin material (hereinafter called PET resin) M (see FIG. 6) into the cavity mold to form a body d (see FIG. 7), and flows the PET resin M from inside to outside of the cores 1 to form a bottle neck 21, then molds thus formed parison 4 (see FIG. 7) by biaxially stretch-blowing, thereby forming a bottle (not shown), and it comprises a moving plate 3 for receiving multiple cores 1 through a core transfer device 2 for mounting and holding multiple cores 1, and a parison forming mold device (hereinafter called mold device for short) 5 for forming parisons 4 from the multiple cores 1 supplied from the moving plate 3, and further the moving plate 3 has core feed rows $A_1$, $A_2$, $A_3$, $A_4$ composed of multiple core receiving holders 6 for feeding multiple cores 1 into the mold device 5, and parison takeout rows $C_1$, $C_2$, $C_3$, $C_4$ composed of multiple parison receiving holders 7 for taking out and receiving already formed multiple parisons 4 from the mold device, when moved to a parison receiving position B into the mold device 5, formed at a distance of a specific pitch interval d from the core feed rows $A_1$, $A_2$, $A_3$, $A_4$, and the moving plate 3 is designed to shift by the specific pitch interval d from the parison receiving position B in order to feed cores 1 from the core feed rows 6 to the mold device 5 which is empty after the parisons 4 are taken out. Instead of shifting the moving plate, alternatively, only the core feed rows and parison takeout rows may be shifted by the pitch interval d.

Figure 3:
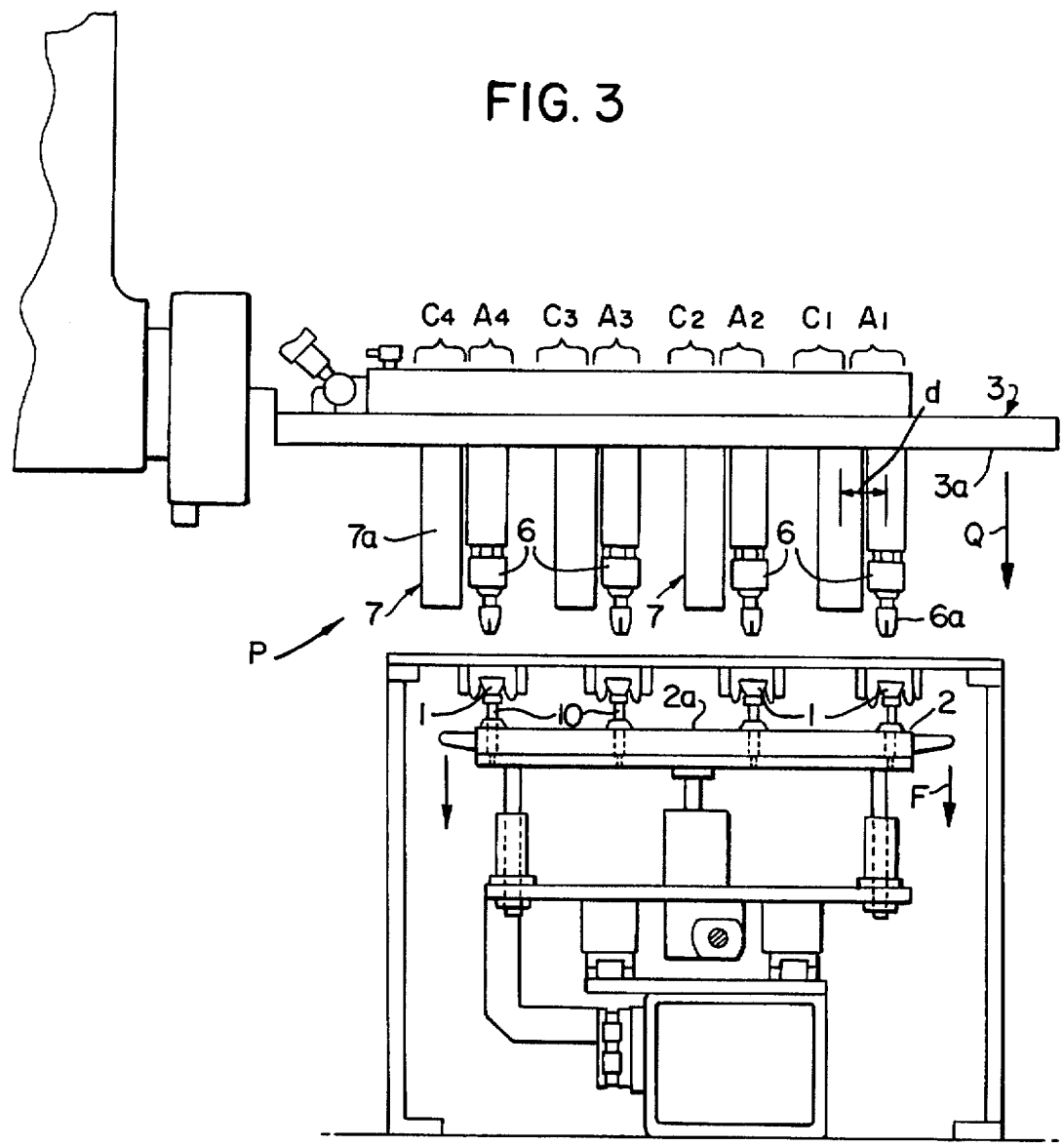
FIG. 3 is an explanatory drawing of a transfer device in the embodiment.

Furthermore, as shown in FIG. 3, the parison takeout rows $C_1$, $C_2$, $C_3$, $C_4$ and core feed rows $A_1$, $A_2$, $A_3$, $A_4$ are formed at a lower side 3a of the moving plate 3, and in this embodiment, there are four rows of parison receiving holders 7 of parison takeout rows $C_1$, $C_2$, $C_3$, $C_4$, and the corresponding number of core feed rows $A_1$, $A_2$, $A_3$, $A_4$ are formed respectively at a distance of a pitch interval d. The number of receiving holders 7 of parison takeout rows $C_1$, $C_2$, $C_3$, $C_4$ may be a multiple of the core feed rows $A_1$, $A_2$, $A_3$, $A_4$. In this case, the moving plate 3 is not returned to the parison transfer device until all of the parison receiving holders hold parisons.

The parison receiving holders 7 are composed of tubes 7a so as to receive and hold the parisons 4, and are provided with air suction units for receiving and holding parisons 4. It is further preferred to have cooling units for cooling parisons 4 so that the forming cycle may be accelerated. On the other hand, in FIG. 3, the core receiving holders 6 have chuck members 6a for receiving and holding the cores 1.

The cores 1 are formed, as shown in FIGS. 1 and 2, in a core forming device 8, and the formed cores 1 are held by a core takeout robot 9 having chuck members (not shown), and the cores 1 are transferred from the robot 9 to the core transfer device 2. At this time, the core takeout robot 9 coming out of the core forming device 8 is inverted 90° (Z-direction indicated by arrow) so as to confront the transfer surface 2a of the core transfer device 2, and transfers the cores 1 to the transfer surface 2a of the core transfer device 2. On this transfer surface 2a, chuck members 10 are formed for receiving and holding the cores 1. In both chuck members of the core takeout robot 9 and chuck members 10 of the core transfer device 2, the array of chuck members corresponds to the array of core feed rows $A_1$, $A_2$, $A_3$, $A_4$ of the moving plate 3. From the core transfer device 2 after being moved along the core transfer route D up to the core transfer position P immediately beneath the moving plate 3, as shown in FIG. 3, the cores 1 on the transfer surface 2a are transferred to the moving plate 3. At this time of transfer, the core transfer device 2 is in a waiting state, and the moving plate 3 descends in the Q-direction by a specific distance, and the cores 1 are transferred from the chuck members 10 to the core receiving holders 6 of the core feed rows $A_1$, $A_2$, $A_3$, $A_4$. Afterwards, the core transfer device 2 descends in the F-direction, and returns the core transfer route D and goes back to the core receiving position.

The parison forming method is described below.

Figure 4:
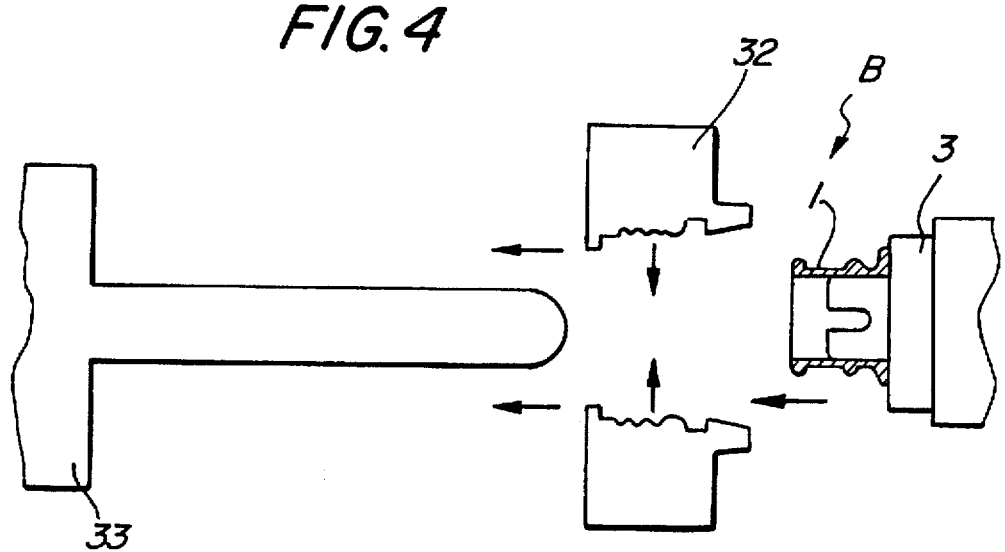
FIG. 4 is an essential structural explanatory drawing showing a core feeding step in the embodiment.
Figure 5:
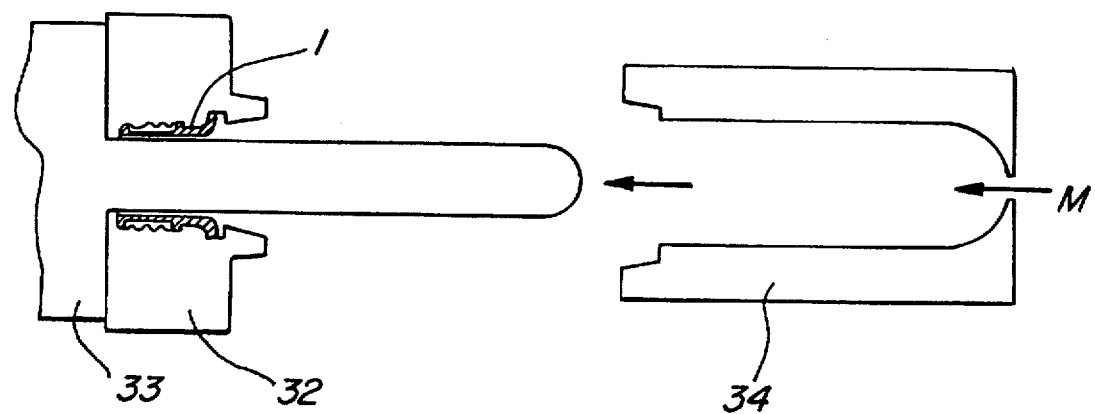
FIG. 5 is an essential structural explanatory drawing showing a clamping step of a mold device in the embodiment.
Figure 7:
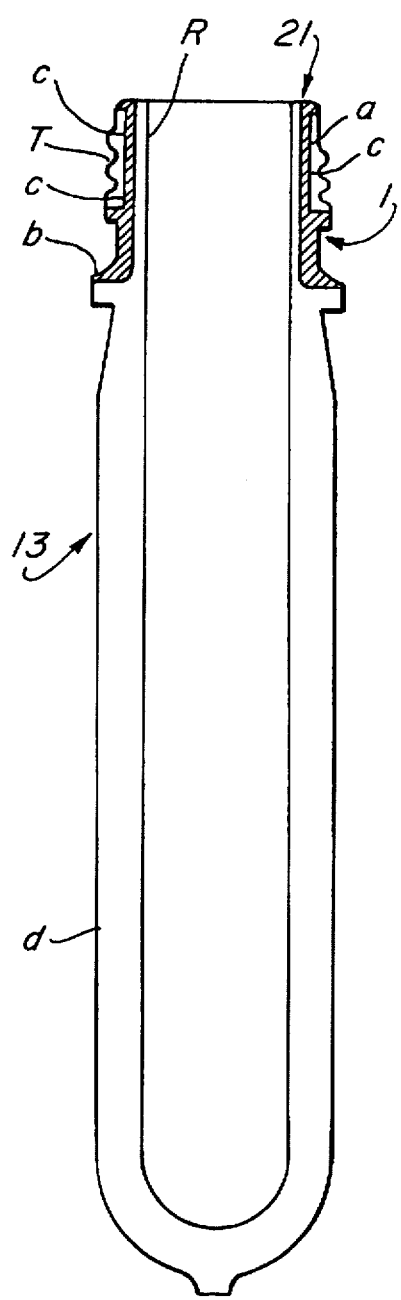
FIG. 7 is a longitudinal sectional view showing a parison.
Figure 8:
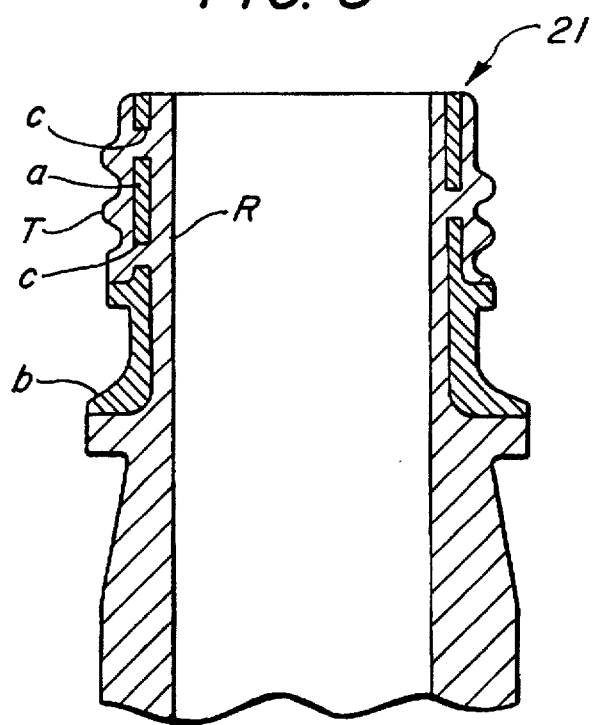
FIG. 8 is a longitudinal sectional view showing a bottle neck of parison.
Figure 9:
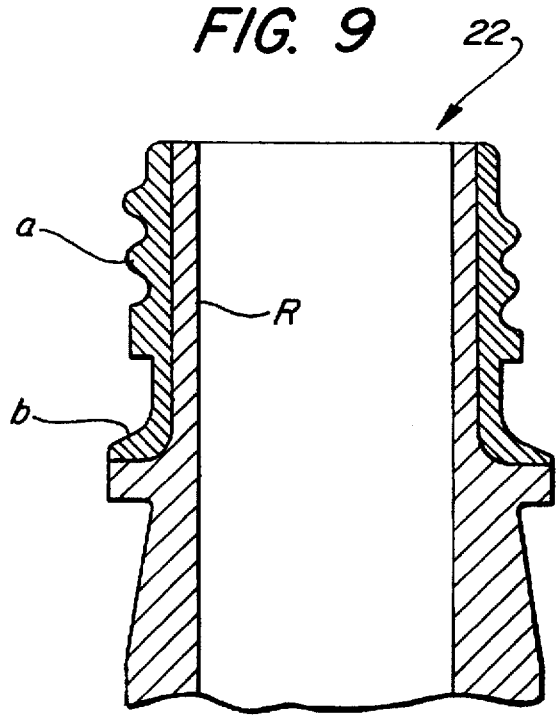
FIG. 9 is a longitudinal sectional view showing a modified example of a bottle neck of parison.

In FIG. 2, first of all, multiple cores 1 are transferred from the core transfer device 2 to the moving plate 3 at the core transfer position P, and the moving plate 3 travels the feed route H into the mold device 5 and reaches the core feeding position B (initial core feed step). At this time, the moving plate 3 is inverted 90° (X-direction indicated by arrow) so that its lower surface 3a may confront the mold device 5, and travels the feed route H from the core transfer position P to the core feeding position B of the mold device 5 (FIG. 4), and successively while forwarding the cores 1 of the core feed rows 6 of the moving plate 3 to the mold device 5 side, and neck mold 32 receives the cores 1 and after being fitted to the cores 1, moves back to fit into a core mold 33. Later, after the moving plate 3 leaves the mold device 5, a cavity mold 34 advances, thereby completing die clamping of the die device 5 (see FIGS. 5, 6). By injection molding of PET resin M into a cavity 35 from the gate G, a body d (see FIG. 7) is formed, and sequentially the PET resin M is flowed from inside to outside of the heat resistant resin core 1 to form bottle neck 21, thereby forming a parison 3 as shown in FIG. 7 (initial parison forming step).

After an empty moving plate 3 returns to the core transfer position P (initial return step), to feed multiple cores 1 transferred at the core transfer position P to the mold device 5 again, the moving plate 3 travels from the core transfer position P to the parison takeout position B of the mold device 5 after the parison forming is completed and the mold device 5 opens (moving step).

Accordingly, again, in the mold device 5, plural parisons 4 formed in the initial parison forming process during the moving step are taken out from the mold device 5, and the parisons 4 are received by the parison receiving holders 7 of the moving plate 3 (parison takeout step).

In succession, to the specified position of the mold device 5 becoming empty after the parisons 4 are taken out, the moving plate 3 holding the parisons 4 travels by the specified pitch d portion, and supplies the cores held in the core feed rows $A_1$, $A_2$, $A_3$, $A_4$ on the moving plate 3 to the specified portion of the mold device 5 which is now empty (core feed step). At this time, one moving plate plays both the role of feeding cores 1 into the mold device 5, and the role of taking out the parisons 4 from the mold device 5, and both operations are executed sequentially, so that the working efficiency is enhanced. That is, it is not necessary to install an extra jig for taking out the parisons from the parison forming mold device, and in this embodiment, both operations are realized only by shifting the moving plate 3 by the portion of the pitch d between the core feed rows 6 and parison takeout rows 7, and the controllability and workability are excellent. Besides, requiring only one moving plate alone, the space is saved substantially in the entire apparatus comprising the control unit.

Consequently, after the moving plate 3 holding the parisons 4 leaves the mold device 5, the mold device is clamped, and until the moving plate 3 travels to the parison takeout position B in the next moving step, parisons are formed in the same manner as in the initial parison forming step (parison forming step).

Next, in the course of the return step until the moving plate 3 leaving the mold device 5 before the parison forming step returns to the core transfer position P, the parisons 4 received in the parison takeout step are transferred to a parison conveying device 11 for blow molding device (parison transfer step). If the number of parison takeout rows is a multiple of the number of core feed rows, it returns to the core transfer position P without transferring to the parison conveying device until all of parison receiving holders receive parisons.

Successively, an empty moving plate 3 transferring the parisons to the parison conveying device 11 returns again to the core transfer position P. Thereafter, the same operation is sequentially repeated.

Finally, by known biaxial stretch-blow molding of parisons 4, a bottle having a transparency same as in the body of PET bottle having biaxial orientation is formed in the bottle neck 21 of the PET bottle without biaxial orientation.

As above described, according to the present invention, the moving plate comprising a core feed row composed of multiple core receiving holders for feeding cores into the mold device, and a parison takeout row composed of multiple parison receiving holders for taking out and receiving the formed multiple parisons out of the mold device, when moved to the core feeding position into the mold device, the parison takeout row being formed at a distance of a specific pitch interval from the core feed row, and one moving plate is responsible for both feeding heat resistant resin cores into a parison forming mold device, and taking out the formed parisons from the mold device, and executes these operations sequentially. Hence, the working efficiency is enhanced. That is, it is not necessary to install another jig for taking out parisons from the parison forming mold device, and simultaneous operation is realized only by shifting the moving plate (or the core feed rows and the parison takeout rows) for the portion of the pitch between the core feed row and parison takeout row, so that the controllability and workability are excellent. Moreover, only one moving plate saves substantially the space of the apparatus itself comprising a control unit.

What is claimed is:

1. A parison forming apparatus for transferring preformed multiple heat resistant resin cores, feeding them into a specified position of a parison forming mold device, feeding a bottle forming resin material into the mold device to form the body, multi-layering the bottle forming resin material and heat resistant resin core to form a bottle neck, and blow molding the thus formed parison by biaxial stretch-blow molding, thereby forming a bottle, comprising:

a core transfer device for transferring resin cores to a load station position including a horizontally disposed carrier that can be moved in a horizontal plane, and elevated to a load station for loading the resin cores;

a moving plate for receiving multiple heat resistant resin cores from the core transfer device a parison forming mold device for receiving the multiple heat resistant resin cores from the moving plate to form parisons, wherein the moving plate possesses core feed rows composed of multiple core receiving holders for feeding the multiple heat resistant resin cores to the mold device, and parison takeout rows composed of multiple parison receiving holders for taking out and receiving already formed multiple parisons from the mold device, being formed at a distance of a specific pitch interval from the core feed rows, and feeds the heat resistant resin cores from the core feed rows into the mold device which is empty after the parisons are taken out; and a parison conveying device that can be moved in a horizontal plane and can operatively receive the formed parisons from the multiple parison receiving holders on the moving plate.

2. The parison forming apparatus of claim 1, wherein the moving plate travels by a specific pitch interval in order to feed the heat resistant resin cores from the core feed rows into the mold device which is empty after the parisons are taken out.

3. The parison forming apparatus of claim 1, wherein the core feed rows and the parison takeout rows on the moving plate travel by a specific pitch interval in order to feed the heat resistant resin cores from the core feed rows into the mold device which is empty after the parisons are taken out.

4. The parison forming apparatus of claim 2, wherein the mold device is composed of neck mold, core mold, cavity mold, and the parison receiving holders are composed of tubes for receiving and holding parisons, and are provided with air suction units for holding parisons.

5. An apparatus for automatically forming a composite blow-molded bottle parison comprising;

means for forming a plastic resin insert core;

molding means for integrally molding the resin insert core into a parison capable of being blow-molded into a plastic bottle;

means for transferring the resin insert core to a load position including a core transfer device that moves laterally from the means for forming to a position beneath the load position and is moved traverse to the lateral movement to the load position to transfer the resin insert core;

receiving means for receiving the molded parison including a parison conveying device, positioned between the molding means and the core transfer device, which moves laterally in parallel to the core transfer device's lateral movement after receipt of the molded parison; and a transfer assembly including a transfer member having means for removably securing the resin insert core at the load position and subsequently rotating 90° to carry the resin insert core laterally to the molding means and means for removably securing the molded parison from the molding means, the transfer assembly moves the transfer member to the load position to load the resin insert core, rotates 90° and sequentially moves the transfer member with the resin insert core to the molding means, whereby the means securing the molded parison removably secures a molded parison, the transfer member is then moved to load the resin insert core in the molding means and subsequently to the receiving means and rotates 90° for transferring the molded parison and the means for removably securing the molded parison releases the molded parison onto the receiving means.

6. The apparatus of claim 5, wherein the core transfer device includes a plate mounting a plurality of positions for securing a core and a plurality of positions for securing a molded parison, the respective core positions and molded parison positions are intermixed and positioned apart by a constant pitch distance to serve a molding means having multiple mold cavities.

7. The apparatus of claim 6 wherein the receiving means is positioned below the molding means.

8. A parison forming apparatus of claim 6, wherein the plate travels by a specific pitch interval in order to feed the heat resistant resin cores from the core securing positions into the mold device which is empty after the parisons are taken out.

9. A parison forming apparatus of claim 6, wherein the core securing positions and the parison securing positions on the plate travel by a specific pitch interval in order to feed the heat resistant resin cores from the core securing positions into the mold device which is empty after the parisons are taken out.

10. A parison forming apparatus of claim 5 wherein the molding means is composed of neck mold, core mold, and cavity mold, and the parison securing means are composed of tubes for receiving and holding parisons, and are provided with air suction units for holding parisons.

11. The parison forming apparatus of claim 8, wherein the molding means is composed of neck mold, core mold, cavity mold, and the parison securing means are composed of tubes for receiving and holding parisons, and are provided with air suction units for holding parisons.

12. The parison forming apparatus of claim 9, wherein the molding means is composed of neck mold, core mold, cavity mold, and the parison securing means are composed of tubes for receiving and holding parisons, and are provided with air suction units for holding parisons.

* * * * *